United States Patent
Wilson et al.

(10) Patent No.: US 12,475,720 B2
(45) Date of Patent: Nov. 18, 2025

(54) METHODS AND SYSTEMS FOR PARKING DETECTION

(71) Applicant: ZF Friedrichshafen AG, Friedrichshafen (DE)

(72) Inventors: David W. Wilson, Milford, MI (US); Pulkit Monga, Westland, MI (US); Kalash Jain, Bloomfield Hills, MI (US); Olivier Barree, Elancourt (FR); Dena Memari, North Bergen, NJ (US)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/315,701

(22) Filed: May 11, 2023

(65) Prior Publication Data
US 2023/0368546 A1 Nov. 16, 2023

Related U.S. Application Data

(60) Provisional application No. 63/341,185, filed on May 12, 2022.

(51) Int. Cl.
| | | |
|---|---|---|
| G06V 20/58 | (2022.01) | |
| G06V 10/25 | (2022.01) | |
| G06V 20/56 | (2022.01) | |
| G08G 1/14 | (2006.01) | |

(52) U.S. Cl.
CPC ............ *G06V 20/586* (2022.01); *G06V 10/25* (2022.01); *G06V 20/582* (2022.01); *G06V 20/588* (2022.01); *G08G 1/141* (2013.01); *G08G 1/146* (2013.01)

(58) Field of Classification Search
CPC .... G06V 20/586; G06V 10/25; G06V 20/582; G06V 20/588; G08G 1/141; G08G 1/146
See application file for complete search history.

(56) References Cited

U.S. PATENT DOCUMENTS

| | | | |
|---|---|---|---|
| 11,137,754 B2* | 10/2021 | Van Wiemeersch | G05D 1/0022 |
| 12,067,878 B1* | 8/2024 | Campbell | G06Q 40/08 |
| 2014/0055601 A1* | 2/2014 | Yamada | H04N 23/63 348/148 |
| 2019/0180621 A1* | 6/2019 | Matsuda | B60R 21/00 |
| 2020/0307554 A1 | 10/2020 | Lai et al. | |

FOREIGN PATENT DOCUMENTS

| | | | |
|---|---|---|---|
| DE | 102015211514 A1 * | 12/2016 | G01C 21/32 |
| JP | 2017076275 A * | 4/2017 | |

OTHER PUBLICATIONS

Burleigh, Nicholas et al. "Deep Learning for Autonomous Driving" 2019 Digital Image Computing: Techniques and applications(Dicta), IEEE, Dec. 2, 2019, pp. 1-8, XP033683049.
European Search Report for Application No. EP23172470 Dated Sep. 7, 2023.

* cited by examiner

*Primary Examiner* — Rufus C Point
(74) *Attorney, Agent, or Firm* — Dority & Manning, P.A.

(57) ABSTRACT

A parking detection method includes: accessing data corresponding to an image from a camera on a vehicle; computing a confidence score for a possible vacant parking location from the data corresponding to the image from the camera on the vehicle; and when the confidence score is greater than a threshold confidence, identifying the possible vacant parking location as an actual vacant parking location from the data corresponding to the image from the camera on the vehicle.

20 Claims, 7 Drawing Sheets

METHODS AND SYSTEMS FOR PARKING DETECTION

CROSS-REFERENCE TO RELATED APPLICATION

The present application is related and claims priority to U.S. Provisional Patent Application No. 63/341,185 filed in the United States Patent & Trademark Office on May 12, 2022, which is incorporated by reference in its entirety for all purposes.

FIELD OF THE INVENTION

The present subject matter relates generally to systems and methods for parking detection.

BACKGROUND OF THE INVENTION

Vehicles are generally parked when not in operation. Thus, when a driver arrives at a destination, the driver may search for a parking spot to park the vehicle. Searching for a parking spot can be tedious and time consuming. For example, when a parking lot is close to full, it can take the driver several minutes to find an open parking spot.

Automatic parking identification systems are available but require a surround-view camera system with at least four wide field of view cameras. Such known systems are thus complex and expensive. Entry-level and many middle-class vehicles do not include surround-view camera systems due to the associated complexity and cost.

Accordingly, improved systems and methods for parking detection would be useful.

BRIEF DESCRIPTION OF THE INVENTION

Aspects and advantages of the invention will be set forth in part in the following description, or may be apparent from the description, or may be learned through practice of the invention.

In an example embodiment, a parking detection method includes: accessing, with a computing device, data corresponding to an image from a front camera on the vehicle taken; computing, with the computing device, a confidence score for a possible parking location from the data corresponding to the image from the front camera on the vehicle, wherein computing the confidence score comprises detecting a possible parking sign located on or above a roadway from the data corresponding to the image from the front camera on the vehicle; and, when the confidence score is greater than a threshold confidence, identifying, with the computing device, the possible parking location as an actual parking location.

In a first example aspect, the method may further include accessing, with the computing device, data corresponding to a location of a vehicle, wherein accessing the data corresponding to the image from the front camera comprises accessing the data corresponding to the image from the front camera while the location of the vehicle corresponds to a region of interest.

In a second example aspect, the region of interest may include an area near a destination of the vehicle.

In a third example aspect, computing the confidence score may further include one or more of: detecting a possible parking lane from the data corresponding to the image from the front camera on the vehicle; detecting a possible road marking from the data corresponding to the image from the front camera on the vehicle; and detecting a possible parked vehicle from the data corresponding to the image from the front camera on the vehicle.

In a fourth example aspect, the method may further include transmitting data corresponding to a location of the actual parking location to a remote computing device located offboard the vehicle.

In a fifth example aspect, a control unit may be programmed to implement the method.

Each of the example aspects recited above may be combined with one or more of the other example aspects recited above in certain embodiments. For instance, all of the five example aspects recited above, i.e., the first through fifth example aspects, may be combined with one another in some embodiments. As another example, any combination of two, three, or four of the five example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

In another example embodiment, a parking detection method includes: accessing, with a computing device, data corresponding to an image from a rear camera on the vehicle; computing, with the computing device, a confidence score for a possible parking location from the data corresponding to the image from the rear camera on the vehicle, wherein computing the confidence score comprises detecting a possible parking sign located on a roadway from the data corresponding to the image from the rear camera on the vehicle; and, when the confidence score is greater than a threshold confidence, identifying, with the computing device, the possible parking location as an actual parking location.

In a sixth example aspect, the method may further include accessing, with the computing device, data corresponding to a location of a vehicle, wherein accessing the data corresponding to the image from the rear camera comprises accessing the data corresponding to the image from the rear camera while the location of the vehicle corresponds to a region of interest.

In a seventh example aspect, the region of interest may include an area near a destination of the vehicle.

In an eighth example aspect, computing the confidence score may further include one or more of: detecting a possible parking lane from the data corresponding to the image from the rear camera on the vehicle; detecting a possible road marking from the data corresponding to the image from the rear camera on the vehicle; and detecting a possible parked vehicle from the data corresponding to the image from the rear camera on the vehicle.

In a ninth example aspect, the method may further include transmitting data corresponding to a location of the actual parking location to a remote computing device located offboard the vehicle.

In a tenth example aspect, a control unit may be programmed to implement the method.

Each of the example aspects recited above may be combined with one or more of the other example aspects recited above in certain embodiments. For instance, all of the five example aspects recited above, i.e., the sixth through tenth example aspects, may be combined with one another in some embodiments. As another example, any combination of two, three, or four of the five example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

In another example embodiment, a parking detection method includes: accessing, with a computing device, data corresponding to an image from a front camera on a vehicle; accessing, with the computing device, data corresponding to an image from a rear camera on the vehicle; identifying, with the computing device, a possible vacant parking location from one or both of the data corresponding to the image from the front camera on the vehicle and the data corresponding to the image from the rear camera on the vehicle; computing, with the computing device, a confidence score for the possible vacant parking location from one or both of the data corresponding to the image from the front camera on the vehicle and the data corresponding to the image from the rear camera on the vehicle; and, when the confidence score is greater than a threshold confidence, identifying, with the computing device, the possible vacant parking location as an actual vacant parking location.

In an eleventh example aspect, the front camera may include a camera configured as a component of an advanced driver assistance system of the vehicle.

In a twelfth example aspect, the rear camera may include a camera configured as a backup camera of the vehicle.

In a thirteenth example aspect, computing the confidence score may include one or more of: detecting a possible parking sign from one or both of the data corresponding to the image from the front camera on the vehicle and the data corresponding to the image from the rear camera on the vehicle; detecting a possible parking lane from one or both of the data corresponding to the image from the front camera on the vehicle and the data corresponding to the image from the rear camera on the vehicle; detecting a possible road marking from one or both of the data corresponding to the image from the front camera on the vehicle and the data corresponding to the image from the rear camera on the vehicle; and detecting a possible parked vehicle from one or both of the data corresponding to the image from the front camera on the vehicle and the data corresponding to the image from the rear camera on the vehicle.

In a fourteenth example aspect, the method may further include: determining, with the computing device, one or more parameters of the actual vacant parking location, wherein the one or more parameters comprise an orientation of the actual parking spot and a size of the parking spot; and transmitting data corresponding to a location of the actual vacant parking location and the one or more parameters of the actual vacant parking location to another computing device located offboard the vehicle.

In a fifteenth example aspect, the computing device may be located onboard the vehicle, and the method may further include transmitting, with the computing device, data corresponding to the actual parking location to another computing device located offboard the vehicle.

In a sixteenth example aspect, transmitting the data corresponding to actual parking location may include transmitting the data corresponding to actual parking location at a configurable frequency.

In a seventeenth example aspect, a control unit may be programmed to implement the method.

Each of the example aspects recited above may be combined with one or more of the other example aspects recited above in certain embodiments. For instance, all of the seven example aspects recited above, i.e., the eleventh through seventeenth example aspects, may be combined with one another in some embodiments. As another example, any combination of two, three, four, or more of the seven example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
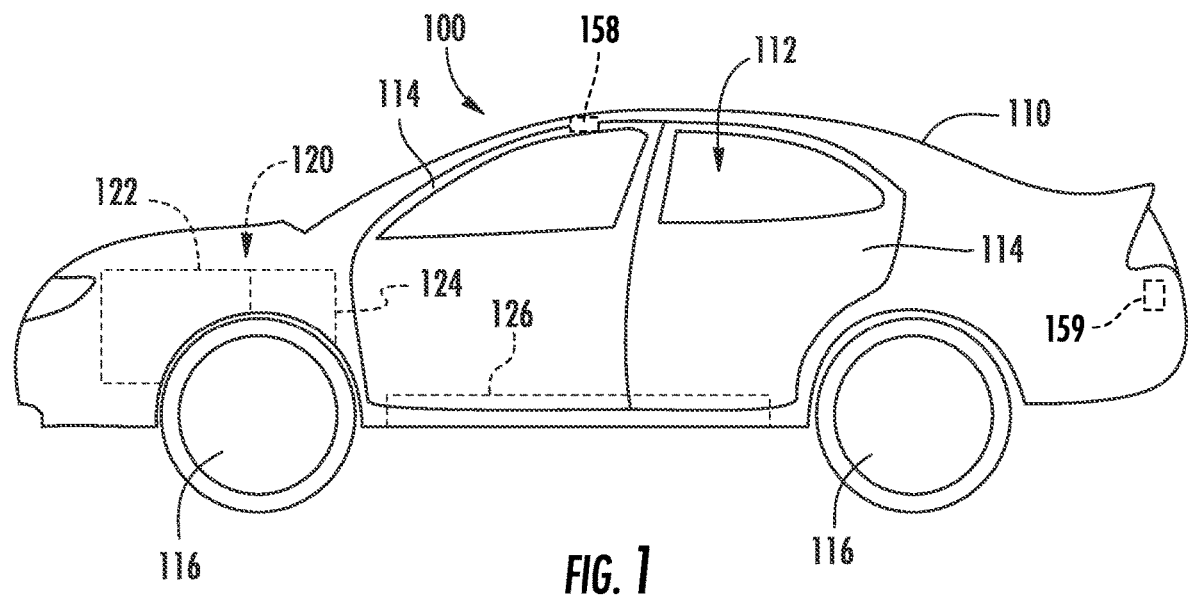
FIG. 1 is a side, elevation view of a passenger vehicle according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Figure 2:
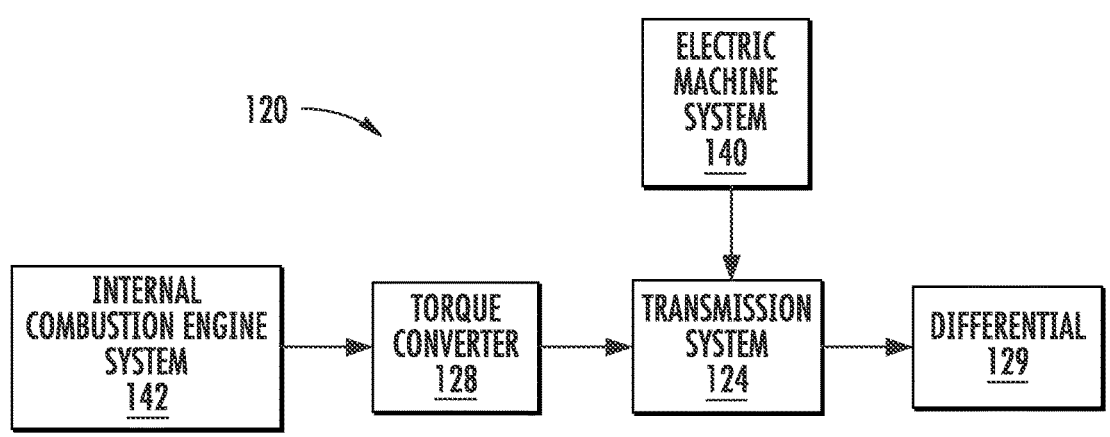
FIG. 2 is a schematic view of a drivetrain of the example vehicle of FIG. 1.

FIG. 1 is a side, elevation view of a passenger vehicle 100 according to an example embodiment. FIG. 2 is a schematic view of a drivetrain system 120 of passenger vehicle 100. As shown in FIG. 1, passenger vehicle 100 is illustrated as a sedan. However, passenger vehicle 100 in FIG. 1 is provided as an example only. For instance, passenger vehicle 100 may be a coupe, a convertible, a truck, a van, a sports utility vehicle, etc. in alternative example embodiments. In addition, while described below in the context of passenger vehicle 100, it will be understood that the present subject matter may be used in or with any other suitable vehicles, including commercial vehicles, such as tractor-trailers, busses, box trucks, farm vehicles, construction vehicles, etc., in other example embodiments.

Passenger vehicle 100 may include a body 110 rolls on wheels 116 during driving of passenger vehicle 100. Body 110 that defines an interior cabin 112, and a driver and passengers may access interior cabin 112 via doors 114 and sit within interior cabin 112 on seats (not shown). Within body 110, passenger vehicle 100 may also include various systems, including a motor system 122, a transmission system 124, an electrical accumulator/storage system 126, etc., for operating passenger vehicle 100.

In general, motor system 122, transmission system 124, and electrical accumulator system 126 may be configured in any conventional manner. For example, motor system 122 may include prime movers, such as an electric machine system 140 and an internal combustion engine system 142 (FIG. 2), that are operatable to propel passenger vehicle 100. Thus, passenger vehicle 100 may be referred to as a hybrid vehicle. Motor system 122 may be disposed within body 110 and may be coupled to transmission system 124. Transmission system 124 is disposed within power flow between motor system 122 and wheels 116 of passenger vehicle 100. In certain example embodiments, a torque converter 128 may be disposed in the power flow between internal combustion engine system 142 and transmission system 124 within drivetrain system 120. Transmission system 124 is operative to provide various speed and torque ratios between an input and output of the transmission system 124. Thus, e.g., transmission system 124 may provide a mechanical advantage to assist propulsion of passenger vehicle 100 by motor system 122. A differential 129 may be provided between transmission system 124 and wheels 116 to couple transmission system 124 and wheels 116 while also allowing relative rotation between wheels 116 on opposite sides of body 110.

Electric machine system 140 may be selectively operable as either a motor to propel passenger vehicle 100 or as a generator to provide electrical power, e.g., to electrical accumulator system 126 and other electrical consumers of passenger vehicle 100. Thus, e.g., electric machine system 140 may operate as a motor in certain operating modes of passenger vehicle 100, and electric machine system 140 may operate as generator in other operating modes of passenger vehicle 100. Electric machine system 140 may disposed within drivetrain system 120 in various arrangements. For instance, electric machine system 140 may be provided as a module in the power flow path between internal combustion engine system 142 and transmission system 124. As another example, electric machine system 140 may be integrated within transmission system 124.

Electrical accumulator system 126 may include one or more batteries, capacitors, etc. for storing electrical energy. Electric machine system 140 is coupled to electrical accumulator system 126 and may be selectively operable to charge electrical accumulator system 126 when operating as a generator and to draw electrical power from electrical accumulator system 126 to propel passenger vehicle 100 when operating as a motor.

A braking system (not shown) is operable to decelerate passenger vehicle 100. For instance, the braking system may include friction brakes configured to selectively reduce the rotational velocity of wheels 116. The braking system may also be configured to as a regenerative braking system that converts kinetic energy of wheels 116 into electric current. Operation of motor system 122, transmission system 124, electrical accumulator system 126, and the braking system are well known to those skilled in the art and not described in extensive detail herein for the sake of brevity.

Figure 3:
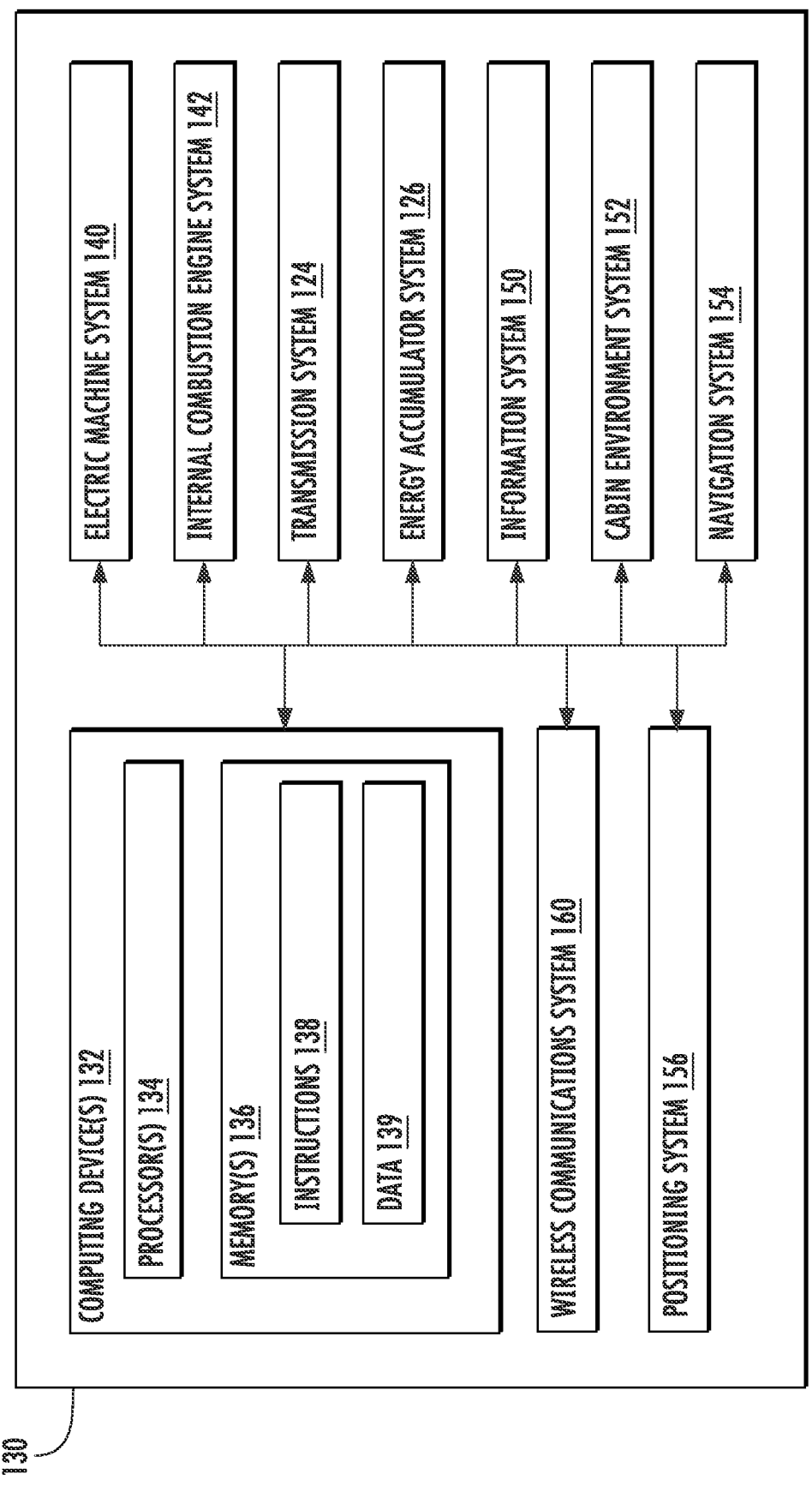
FIG. 3 is a schematic view of an example control system of the vehicle of FIG. 1 according to an example embodiment of the present subject matter.

FIG. 3 is a schematic view of certain components of a control system 130 suitable for use with passenger vehicle 100. In general, control system 130 is configured to control operation of passenger vehicle 100 and components therein. Control system 130 may facilitate operation of passenger vehicle 100 in various operating modes. For instance, control system 130 may be configured to operate passenger vehicle 100 in any one of a conventional mode, an electric mode, a hybrid mode, and a regeneration mode. In the conventional mode, passenger vehicle 100 is propelled only by internal combustion engine system 142. Conversely, passenger vehicle 100 is propelled only by electrical machine system 140 in the electric mode. The conventional mode may provide passenger vehicle 100 with an extended operating range relative to the electric mode, and passenger vehicle 100 may be quickly refilled at a fueling station to allow continued operation of passenger vehicle 100 in the conventional mode. Conversely, the emissions of passenger vehicle 100 may be significantly reduced in the electric mode relative to the conventional mode, and a fuel efficiency of passenger vehicle 100 may increase significantly in the electric mode as compared to the conventional mode. In the hybrid mode, passenger vehicle 100 may be propelled by both electrical machine system 140 and internal combustion engine system 142. In the regeneration mode, electrical machine system 140 may charge electrical accumulator system 126, e.g., and internal combustion engine system 142 may propel passenger vehicle 100. The various operating modes of passenger vehicle 100 are well known to those skilled in the art and not described in extensive detail herein for the sake of brevity.

As shown in FIG. 3, control system 130 includes one or more computing devices 132 with one or more processors 134 and one or more memory devices 136 (hereinafter referred to as "memories 136"). In certain example embodiments, control system 130 may correspond to an electronic control unit (ECU) of passenger vehicle 100. The one or more memories 136 stores information accessible by the one or more processors 134, including instructions 138 that may be executed and data 139 usable by the one or more processors 134. The one or more memories 136 may be of any type capable of storing information accessible by the one or more processors 134, including a computing device-readable medium. The memory is a non-transitory medium, such as a hard-drive, memory card, optical disk, solid-state, tape memory, or the like. The one or more memories 136 may include different combinations of the foregoing, whereby different portions of the instructions and data are stored on different types of media. The one or more processor 134 may be any conventional processors, such as commercially available CPUs. Alternatively, the one or more processors 134 may be a dedicated device, such as an ASIC or other hardware-based processor.

Instructions 138 may be any set of instructions to be executed directly (such as machine code) or indirectly (such as scripts) by the one or more processors 134. For example, the instructions 138 may be stored as computing device code on the computing device-readable medium of the one or more memories 136. In that regard, the terms "instructions" and "programs" may be used interchangeably herein. Instructions 138 may be stored in object code format for direct processing by the processor or in any other computing device language, including scripts or collections of independent source code modules that are interpreted on demand or compiled in advance. Data 139 may be retrieved, stored, or modified by the one or more processors 134 in accordance with the instructions 138. For instance, data 139 of the one or more memories 136 may store information from sensors of various systems of passenger vehicle 100, including motor system 122 (e.g., electrical machine system 140 and internal combustion engine system 142), transmission system 124, electrical accumulator system 126, etc. In FIG. 3, the processor(s) 134, memory(ies) 136, and other elements of computing device(s) 132 are shown within the same block. However, computing device(s) 132 may actually include multiple processors, computing devices, and/or memories that may or may not be stored within a common physical housing. Similarly, the one or more memories 136 may be a hard drive or other storage media located in a housing different from that of the processor(s) 134. Accordingly, computing device(s) 132 will be understood to include a collection of processor(s) and one or more memories that may or may not operate in parallel.

Computing device(s) 132 may be configured for communicating with various components of passenger vehicle 100. For example, computing device(s) 132 may be in operative communication with various systems of passenger vehicle 100, including motor system 122 (e.g., electrical machine system 140 and internal combustion engine system 142), transmission system 124, electrical accumulator system 126, etc. For instance, computing device(s) 132 may particularly be in operative communication with an engine control unit (ECU) (not shown) of motor system 122 and a transmission control unit (TCU) (not shown) of transmission system 124. Computing device(s) 132 may also be in operative communication with other systems of passenger vehicle 100, including a passenger/driver information system 150, e.g., that includes one or mode display(s), speaker(s), gauge(s), etc. within interior cabin 112 for providing information regarding operation of passenger vehicle 100 to a passenger/driver, a cabin environment system 152 for modifying the temperature of interior cabin 112, e.g., via air conditioning, heating, etc., a navigation system 154 for navigating passenger vehicle 100 to a destination, and/or a positioning system 156 for determining a current location (e.g., GPS coordinates) of passenger vehicle 100. Computing device(s) 132 may be configured to control system(s) 122, 124, 126 based at least in part on inputs received from an operator via a user interface (not shown), which may include one or more of a steering wheel, a gas pedal, a clutch pedal, a brake pedal, turn signal lever, hazard light switch, and/or the like.

Control system 130 may also include a wireless communication system 160 assists with wireless communication with other systems. For instance, wireless communication system 160 may wirelessly connect control system 130 with one or more other vehicles, buildings, etc. directly or via a communication network. Wireless communication system 160 may include an antenna and a chipset configured to communicate according to one or more wireless communication protocols, such as Bluetooth, communication protocols described in IEEE 802.11, GSM, CDMA, UMTS, EV-DO, WiMAX, LTE, Zigbee, dedicated short range communications (DSRC), radio frequency identification (RFID) communications, etc. It should be appreciated that the internal communication between the computing device(s) 132 and the system(s) 122, 124, 126, 140, 142 within passenger vehicle 100 may be wired and/or wireless. As a particular example, systems within passenger vehicle 100 may be connected and communicate via a CAN bus.

Figure 4:
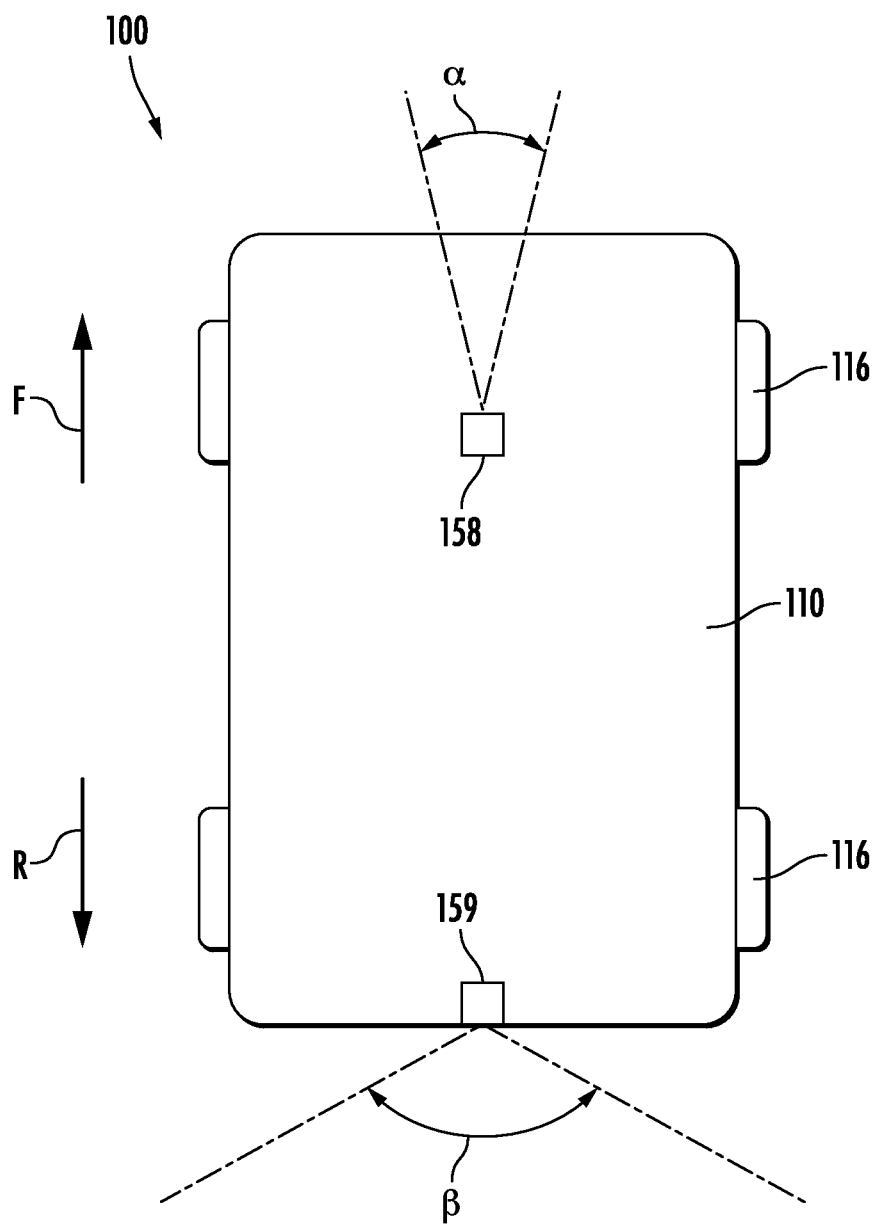
FIG. 4 is a schematic view of certain components of a parking identification system according to an example embodiment of the present subject matter within the example vehicle of FIG. 1.

FIG. 4 is a schematic view of certain components of a parking identification system of passenger vehicle 100. As may be seen in FIG. 4, passenger vehicle 100 may include a front camera 158 and a rear camera 159. Front camera 158 may be a component of an advanced driver assistance system (ADAS) of passenger vehicle 100. For example, front camera 158 may be oriented on body 110 along a forward direction of travel F. Thus, front camera 158 may capture image(s) of an area in front of passenger vehicle 100 during travel. For instance, front camera 158 may capture image(s) of vehicles in front of passenger vehicle 100 during travel, and image(s) from front camera 158 may be utilized for adaptive cruise control, forward collision warning, etc. In certain example embodiments, front camera 158 may be a monochrome camera, e.g., such that images from front camera 158 are black and white or in varying tones of only one color. Rear camera 159 may be a backup camera for passenger vehicle 100. For example, rear camera 159 may be oriented on body 110 along a reverse direction of travel R. Thus, rear camera 159 may capture image(s) of an area behind of passenger vehicle 100 during travel. For instance, rear camera 159 may capture image(s) of vehicles or pedestrians behind passenger vehicle 100 during travel, and image(s) from rear camera 159 may be presented on a display of driver information system 150 so that the driver of passenger vehicle 100 may utilize such images during reverse travel of passenger vehicle 100. In certain example embodiments, rear camera 159 may be a color camera, e.g., such that images from rear camera 159 may include multiple, different colors, such as a spectrum of colors.

Front camera 158 and rear camera 159 may have different fields of view. For example, front camera 158 may have a narrower field of view relative to rear camera 159. As an example, front camera 158 may have a horizontal field of view α, and the horizontal field of view α may be no less than eighty degrees (80°) and no greater than one hundred and twenty degrees (120°). In certain example embodiments, the horizontal field of view α of front camera 158 may be about one hundred degrees (100°), and a vertical field of view of front camera 158 may be about fifty degrees (50°). As another example, rear camera 159 may have a horizontal field of view β, and the horizontal field of view β may be no less than one hundred and seventy (170°) and no greater than two hundred and ten degrees (210°). In certain example embodiments, the horizontal field of view β of rear camera 159 may be about one hundred degrees and ninety (190°), and a vertical field of view of rear camera 159 may be about one hundred and forty degrees (140°).

Passenger vehicle 100 may also include features for detecting parking locations. For example, the parking identification system of passenger vehicle 100 may utilize images from front and rear cameras 158, 159 to detect and confirm parking locations. Moreover, a possible parking location may be identified from an image from front camera 158, and the possible parking location may be confirmed as an actual parking location from an image from rear camera 159. Accordingly, the parking identification system of passenger vehicle 100 may utilize front camera 158 (e.g., which is also used for ADAS purposes and/or is a monochrome, narrow field of view camera) and rear camera 159 (e.g., which is also used as a backup camera and/or is a color, wide field of view camera) to detect and confirm parking locations. Outputs from the front and rear cameras 158, 159 may be meshed together (e.g., via image reversal) to assist with identifying and/or confirming the parking locations. As may be seen from the above, in certain example embodiments, the parking identification system of passenger vehicle 100 may utilize two cameras that are customarily used for other purposes to supplementarily identify parking locations. The parking identification system of passenger vehicle 100 may not utilize a surround-view system, e.g., which includes at least four wide field of view cameras. Rather, in certain example embodiments, the parking identification system of passenger vehicle 100 may include only the front and rear cameras 158, 159, and passenger vehicle 100 may not include a surround-view system.

Figure 5:
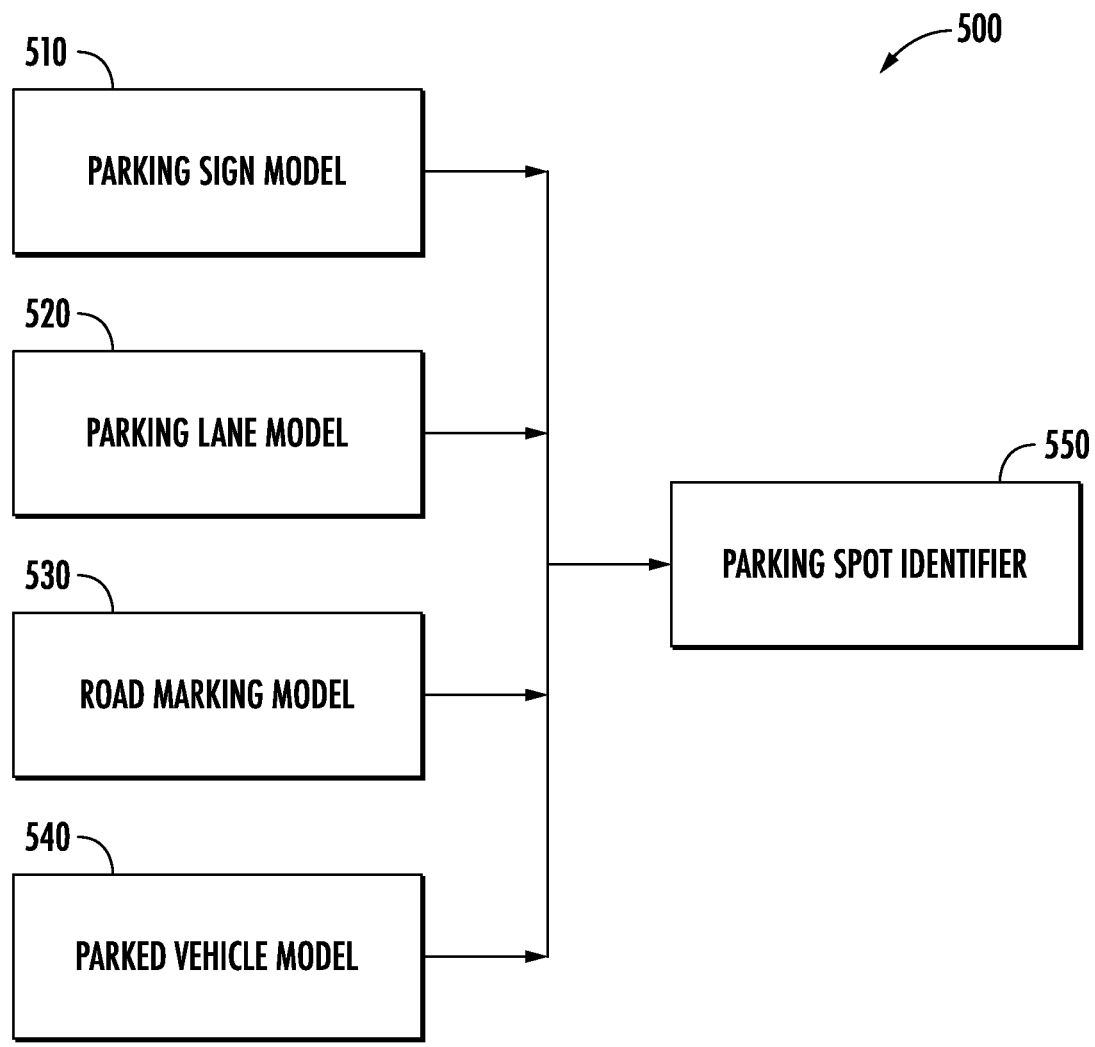
FIG. 5 is a block diagram of a parking identification process according to an example embodiment of the present subject matter, which may be used with the example parking identification system of FIG. 4.

FIG. 5 is block diagram of a process 500, which may be implemented by the parking identification system of passenger vehicle 100. For example, process 500 may be implemented on control system 130 via processors 134 such that process 500 is performed at the edge or on passenger vehicle 100. As noted above, images from front and rear cameras 158, 159 may be used to detect and confirm parking locations. Moreover, front camera 158 may initially detect indicators of possible parking locations, and rear camera 159 may confirm the indicators of possible parking locations, e.g., with sufficient confidence to label the possible parking locations as actual parking locations.

As shown in FIG. 5, process may include four models, namely a parking sign recognition model 510, a parking lane recognition model 520, a road marking recognition model 530, and a parked vehicle recognition model 540. Each of the four models may thus recognize, detect, or identify a respective indicator of a possible parking location. Moreover: parking sign recognition model 510 may be used to recognize, detect, or identify parking traffic signs using images from front camera 158 and/or rear camera 159; parking lane recognition model 520 may be used to recognize, detect, or identify lines or parking space identifiers using images from front camera 158 and/or rear camera 159; road marking recognition model 530 may be used to recognize, detect, or identify road markings using images from front camera 158 and/or rear camera 159; and parked vehicle recognition model 540 may be used to recognize, detect, or identify vehicles and/or objects, e.g., occupying a parking spot, using images from front camera 158 and/or rear camera 159.

For parking sign recognition model 510, front camera 158 and/or rear camera 159 may capture an image of a parking sign. As an example, parking sign recognition model 510 may utilize convolutional neural networks or other object detection algorithms with a library of parking signs and trained (e.g., supervised first and unsupervised later) to recognize, detect, or identify the parking sign within the image(s) taken with front camera 158 and/or rear camera 159. In such a manner, parking sign recognition model 510 may classify parking signs within images taken by front camera 158 and/or rear camera 159.

For parking lane recognition model 520, front camera 158 and/or rear camera 159 may capture an image of a parking lane marking. As an example, parking lane recognition model 520 may utilize convolutional neural networks or other object detection algorithms with a library of parking lane markings and trained (e.g., supervised first and unsupervised later) to recognize, detect, or identify the parking lane marking within the image(s) taken with front camera 158 and/or rear camera 159. In such a manner, parking lane recognition model 520 may classify parking lane markings within images taken by front camera 158 and/or rear camera 159. Parking lane recognition model 520 may also be configured for calculating or estimating a size and/or location of the parking lane/spot within the image(s) taken with front camera 158 and/or rear camera 159.

For road marking recognition model 530, front camera 158 and/or rear camera 159 may capture an image of a road marking. As an example, road marking recognition model 530 may utilize convolutional neural networks or other object detection algorithms with a library of road markings and trained (e.g., supervised first and unsupervised later) to recognize, detect, or identify the road marking within the image(s) taken with front camera 158 and/or rear camera 159. In such a manner, road marking recognition model 530 may classify road markings within images taken by front camera 158 and/or rear camera 159.

For parked vehicle recognition model 540, front camera 158 and/or rear camera 159 may capture an image of a parked vehicle or object within a parking space. As an example, parked vehicle recognition model 540 may utilize convolutional neural networks or other object detection algorithms with a library of vehicles/objects and trained (e.g., supervised first and unsupervised later) to recognize, detect, or identify the parked vehicle or object within the image(s) taken with front camera 158 and/or rear camera 159. In such a manner, parked vehicle recognition model 540 may classify parked vehicles or objects within images taken by front camera 158 and/or rear camera 159. Parking lane recognition model 520 may also be configured for calculating or estimating a position and/or orientation of the vehicles/objects within the image(s) taken with front camera 158 and/or rear camera 159. For example, parking lane recognition model 520 may be configured for determining parameters of the vehicles/objects within the image(s) taken with front camera 158 and/or rear camera 159, such as an orientation (e.g., parallel, perpendicular, angled, etc.) and/or a size of a parking spot. Parking lane recognition model 520 may also utilize a yaw rate and/or steering wheel angle to assist with classifying the location, orientation, and/or size of the parking spot. Moreover, parking lane recognition model 520 may also be configured for detecting whether brake lights or taillights of the vehicles/objects within the image(s) taken with front camera 158 and/or rear camera 159 are lit.

Utilizing the four models and the respective indicators of the possible parking location, a confidence score regarding whether the image(s) taken with front camera 158 and/or rear camera 159 include a parking spot. For example, each of the parking sign recognition model 510, parking lane recognition model 520, road marking recognition model 530, and parked vehicle recognition model 540 may output whether the respective indicator of the possible parking location is present within the image(s). If the confidence score exceeds a first threshold, a parking spot identifier 550 may identify the parking spot with high confidence. If the confidence score exceeds a second threshold but is less than the first threshold, parking spot identifier 550 may identify the parking spot with low confidence. Otherwise, parking spot identifier 550 may conclude that no parking spot is present.

Figure 6:
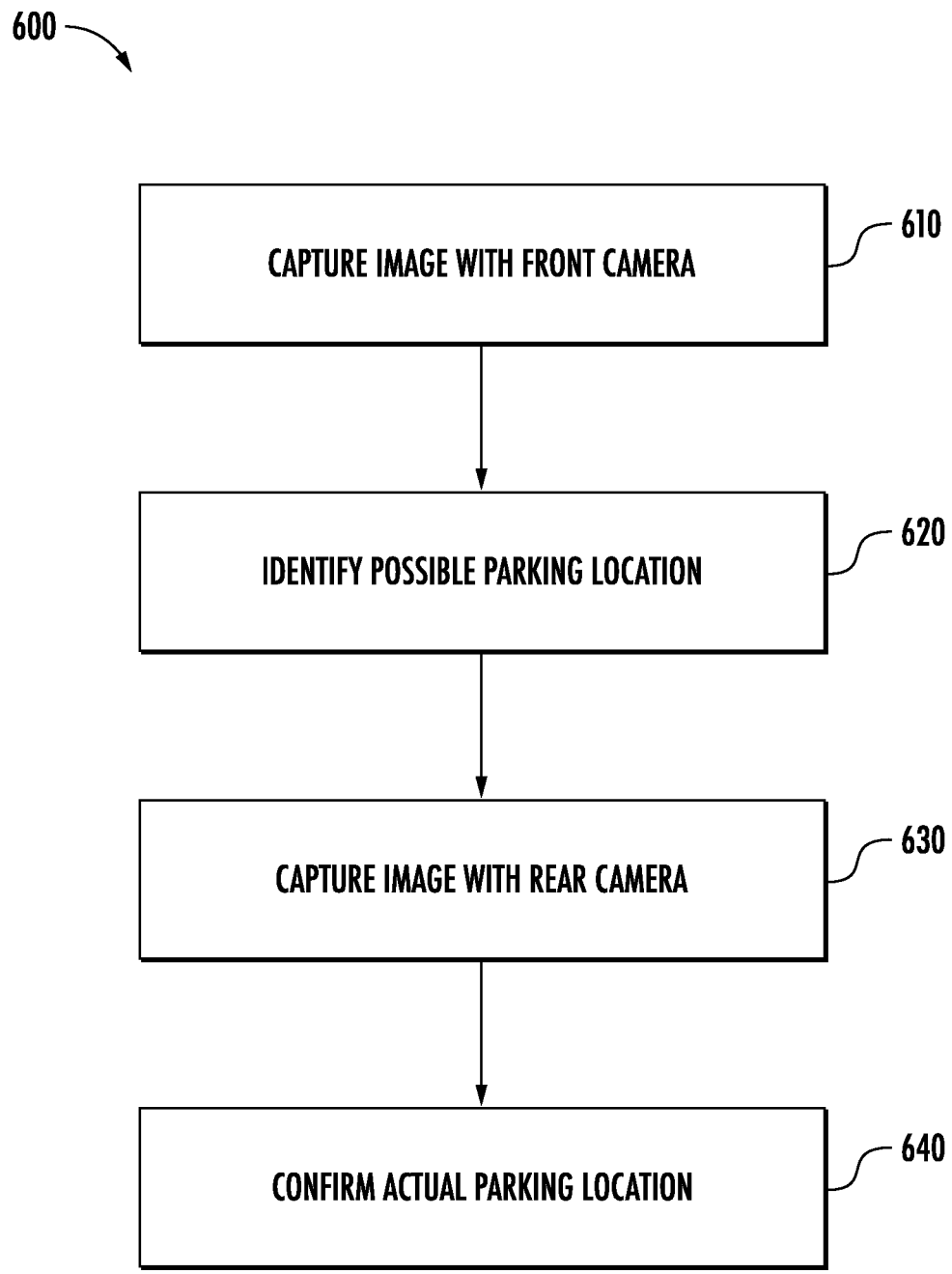
FIG. 6 is a flow diagram of a method for identifying parking according to an example embodiment of the present subject matter.

FIG. 6 is a flow diagram of a method 600 for parking detection according to an example embodiment of the present subject matter. Method 600 will generally be described with reference to passenger vehicle 100 with front camera 158 and rear camera 159. For instance, method 600 may be at least partially executed by the parking identification system, such as by control system 130, front camera 158, and rear camera 159. However, method 600 may be suitable for use with any other suitable type of vehicle, control system configuration, and/or vehicle system. In addition, although FIG. 6 depict steps performed in a particular order for purposes of illustration and discussion, the methods and algorithms discussed herein are not limited to any particular order or arrangement. One skilled in the art, using the disclosures provided herein, will appreciate that various steps of the methods and algorithms disclosed herein can be omitted, rearranged, combined, and/or adapted in various ways without deviating from the scope of the present disclosure.

At 610, front camera 158 may capture an image, e.g., of an area in front of passenger vehicle 100 along the forward direction of travel F. Data corresponding to the image taken by front camera 158 may be received by control system 130. The image taken by front camera 158 may include a possible parking space. At 620, a possible parking location may be identified within the image taken by front camera 158 at 610. For example, control system 130 may be configured to identify the possible parking location from the data corresponding to the image taken by front camera 158. Moreover, control system 130 may be programmed to utilize process 500 and the four models, namely parking sign recognition model 510, parking lane recognition model 520, road marking recognition model 530, and parked vehicle recognition model 540, to calculate whether the possible parking location is present within the image taken by front camera 158 at 610 with high confidence, low confidence, or no confidence.

As a particular example, at 620, identifying the possible parking location may include identifying a possible parked vehicle with the parked vehicle recognition model 540, Moreover, the possible parking location may correspond to the location of the possible parked vehicle (e.g., with low confidence) from the parked vehicle recognition model 540 when brake lights of the possible parked vehicle are off or deactivated. Conversely, the possible parking location may be eliminated or detected with no confidence when brake lights of the possible parked vehicle are on or activated.

As noted above, front camera 158 may be a monochrome camera and/or may have a narrower field of view than rear camera 159. Conversely, rear camera 159 may be a color camera and/or may have a wider field of view than front camera 158. Thus, image(s) taken with front camera 158 at 610 may lack certain details compared to image(s) taken with rear camera 159. As discussed in greater detail below, method 600 may include verifying the possible parking location identified at 620 via rear camera 159, e.g., when the possible parking location is identified with low confidence.

At 630, rear camera 159 may capture an image, e.g., of an area behind passenger vehicle 100 along the forward direction of travel F. Data corresponding to the image taken by rear camera 159 may be received by control system 130. The image taken by front camera 158 may include the possible parking space. In certain example embodiments, control system 130 may be configured for capturing the same location within the images taken by front camera 158 at 610 and rear camera 159 at 630. Thus, e.g., the same possible parking space may be present within the images taken by front and rear cameras 158, 159. The images taken by front camera 158 at 610 and rear camera 159 at 630 may be meshed together, e.g., via image reversal, to facilitate confirming the possible parking space.

At 640, the possible parking location identified at 620 may be confirmed with the image taken by rear camera 159 at 630. For example, control system 130 may be configured to confirm the possible parking spot by identifying the possible parking location from the data corresponding to the image taken by rear camera 159. Moreover, control system 130 may mesh together the images taken by front camera 158 at 610 and rear camera 159 at 630 and utilize image reversal to confirm that the possible parking space is an actual parking space with high confidence. For instance, control system 130 may be programmed to utilize process 500 and the four models, namely parking sign recognition model 510, parking lane recognition model 520, road marking recognition model 530, and parked vehicle recognition model 540, to calculate whether the possible parking location is present within the image taken by rear camera 159 at 630 (and/or the mesh of images taken at 610, 630) with high confidence, low confidence, or no confidence. In certain example embodiments, the colors within images from rear camera 159 and/or the wider field of view than front camera 158 may advantageously assist with confirming that the possible parking space is the actual parking spot with high confidence.

Method 600 may also include labeling the confirmed actual parking spot(s) from 640. For example, a location of the actual parking location from 640 may be flagged. Moreover, positioning system 156 may determine the current location (e.g., GPS coordinates) of passenger vehicle 100, and control system 130 may flag the location of the actual parking location as the current location from positioning system 156. As another example, a time when the actual parking location was identified may be flagged. Thus, e.g., control system 130 may timestamp the actual parking location from 640 in order to assist with identifying when the actual parking location was available. Method 600 may also include determining parameters of the actual parking location, such as an orientation (e.g., parallel, perpendicular, angled, etc.) and/or a size of the actual parking spot. A yaw rate and/or steering wheel angle may also be used to assist with classifying the location, orientation, and/or size of the actual parking spot.

Method 600 may also include transmitting the actual parking location from 640 to another computing device, such as a remote server, that is located offboard passenger vehicle 100. Thus, e.g., control system 130 may transmit the actual parking location from 640 to another computing device, e.g., via wireless communication system 160. As noted above, control system 130 may be located onboard passenger vehicle 100. Thus, method 600, including determining the actual parking location, may be conducted or performed at the edge or onboard passenger vehicle 100, and passenger vehicle 100 can share the actual parking location with other vehicles, map services, etc. The communication may be to a backend via direct short-range communication (DSRC), such as vehicle-to-vehicle communications and/or vehicle-to-infrastructure communications.

Figure 7:
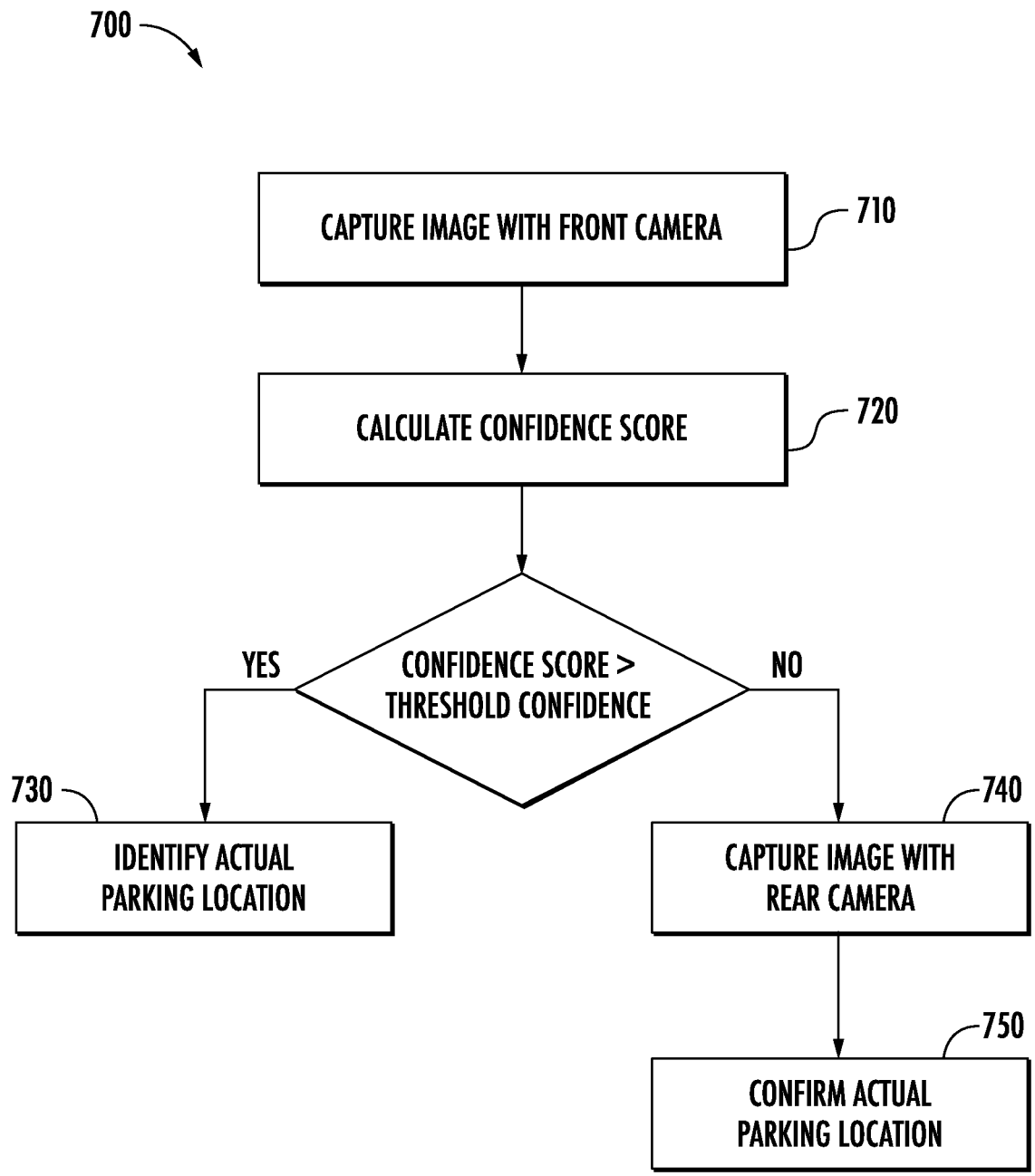
FIG. 7 is a flow diagram of a method for identifying parking according to an example embodiment of the present subject matter.

FIG. 7 is a flow diagram of a method 700 for parking detection according to an example embodiment of the present subject matter. Method 700 will generally be described with reference to passenger vehicle 100 with front camera 158 and rear camera 159. For instance, method 700 may be at least partially executed by the parking identification system, such as by control system 130, front camera 158, and rear camera 159. However, method 700 may be suitable for use with any other suitable type of vehicle, control system configuration, and/or vehicle system. In addition, although FIG. 7 depict steps performed in a particular order for purposes of illustration and discussion, the methods and algorithms discussed herein are not limited to any particular order or arrangement. One skilled in the art, using the disclosures provided herein, will appreciate that various steps of the methods and algorithms disclosed herein can be omitted, rearranged, combined, and/or adapted in various ways without deviating from the scope of the present disclosure.

At 710, front camera 158 may capture an image, e.g., of an area in front of passenger vehicle 100 along the forward direction of travel F. Data corresponding to the image taken by front camera 158 may be received by control system 130. The image taken by front camera 158 may include a possible parking space. A possible parking location may be identified within the image taken by front camera 158 at 710. For example, control system 130 may be configured to identify the possible parking location from the data corresponding to the image taken by front camera 158.

A confidence score for the possible parking location may be calculated at 720. For example, control system 130 may be programmed to utilize process 500 and the four models, namely parking sign recognition model 510, parking lane recognition model 520, road marking recognition model 530, and parked vehicle recognition model 540, to calculate whether the possible parking location is present within the image taken by front camera 158 at 610 with a confidence score, such as high confidence (e.g., greater than seventy-five percent (75%) confidence), low confidence (e.g., greater than fifty percent (50%) confidence and less than seventy-five percent (75%) confidence), or no confidence (e.g., less than fifty percent (50%) confidence). In certain example embodiments, the confidence score at 720 may be calculated in response to detecting a parking prohibition indicator within the image taken by front camera 158 at 710. For instance, a parking sign, a yellow curb, etc. may be detected within the image taken by front camera 158 at 710, which indicates that parking may be available nearby.

As a particular example, at 720, a possible parked vehicle may be identified with the parked vehicle recognition model 540, Moreover, the possible parking location may correspond to the location of the possible parked vehicle (e.g., with low confidence) from the parked vehicle recognition model 540 when brake lights of the possible parked vehicle are off or deactivated. Conversely, the possible parking location may be eliminated or detected with no confidence when brake lights of the possible parked vehicle are on or activated.

As noted above, front camera 158 may be a monochrome camera and/or may have a narrower field of view than rear camera 159. Conversely, rear camera 159 may be a color camera and/or may have a wider field of view than front camera 158. Thus, image(s) taken with front camera 158 at 610 may lack certain details compared to image(s) taken with rear camera 159. At 730, method 700 may include identifying the possible parking location from within the image taken by front camera 158 at 710 as an actual parking location when the confidence score is greater than a threshold confidence, e.g., when the calculated confidence is high. Conversely, method 700 may include verifying the possible parking location using image(s) from the rear camera 159 when the confidence score is less than the threshold confidence, e.g., when the calculated confidence is low. Various factors can negatively affect the confidence score. For example, light conditions, sign or marking occlusion, dust, etc. can negatively affect the confidence score such that method 700 verifies the possible parking location using image(s) from the rear camera 159.

At 740, rear camera 159 may capture an image, e.g., of an area behind passenger vehicle 100 along the forward direction of travel F. Data corresponding to the image taken by rear camera 159 may be received by control system 130. The image taken by front camera 158 may include the possible parking space. In certain example embodiments, control system 130 may be configured for capturing the same location within the images taken by front camera 158 at 710 and rear camera 159 at 740. Thus, e.g., the same possible parking space may be present within the images taken by front and rear cameras 158, 159. The images taken by front camera 158 at 710 and rear camera 159 at 740 may be meshed together, e.g., via image reversal, to facilitate confirming the possible parking space.

At 750, the possible parking location identified from the image taken by front camera 158 at 710 may be confirmed with the image taken by rear camera 159 at 750. For example, control system 130 may be configured to confirm the possible parking spot by identifying the possible parking location from the data corresponding to the image taken by rear camera 159. Moreover, control system 130 may mesh together the images taken by front camera 158 at 710 and rear camera 159 at 740 and utilize image reversal to confirm that the possible parking space is an actual parking space with high confidence. For instance, control system 130 may be programmed to utilize process 500 and the four models, namely parking sign recognition model 510, parking lane recognition model 520, road marking recognition model 530, and parked vehicle recognition model 540, to calculate whether the possible parking location is present within the image taken by rear camera 159 at 740 (and/or the mesh of images taken at 710, 740) with high confidence, low confidence, or no confidence. In certain example embodiments, the colors within images from rear camera 159 and/or the wider field of view than front camera 158 may advantageously assist with confirming that the possible parking space is the actual parking spot with high confidence.

Method 700 may also include labeling the confirmed actual parking spot(s) from 640. For example, a location of the actual parking location from 730, 750 may be flagged. Moreover, positioning system 156 may determine the current location (e.g., GPS coordinates) of passenger vehicle 100, and control system 130 may flag the location of the actual parking location as the current location from positioning system 156. The location of the actual parking space may be added to a map overlayed with street parking specific data and/or be used to update with additional parking features. As another example, a time when the actual parking location was identified may be flagged. Thus, e.g., control system 130 may timestamp the actual parking location from 730, 750 in order to assist with identifying when the actual parking location was available. Method 700 may also include determining parameters of the actual parking location, such as an orientation (e.g., parallel, perpendicular, angled, etc.) and/or a size of the actual parking spot. A yaw rate and/or steering wheel angle may also be used to assist with classifying the location, orientation, and/or size of the actual parking spot.

Method 700 may also include transmitting the actual parking location from 730, 750 to another computing device, such as a remote server, that is located offboard passenger vehicle 100. Thus, e.g., control system 130 may transmit the actual parking location from 730, 750 to another computing device, e.g., via wireless communication system 160. As noted above, control system 130 may be located onboard passenger vehicle 100. Thus, method 700, including determining the actual parking location, may be conducted or performed at the edge or onboard passenger vehicle 100, and passenger vehicle 100 can share the actual parking location with other vehicles, map services, etc. The communication may be to a backend via direct short-range communication (DSRC), such as vehicle-to-vehicle communications and/or vehicle-to-infrastructure communications.

As may be seen from the above, the present subject matter may advantageously utilize two cameras that are customarily used for other purposes to supplementarily identify parking locations. For example, the present subject matter may utilize a front camera, which can be a component of an advanced driver assistance system (ADAS) for adaptive cruise control, to initially detect possible parking locations. The possible parking location can be confirmed with a rear camera, which is also used as a backup camera. Thus, e.g., rather than utilizing a surround-view system with numerous wide field of view cameras, the present subject matter advantageously may identify parking spaces using two cameras also used for other purposes.

Figure 8:
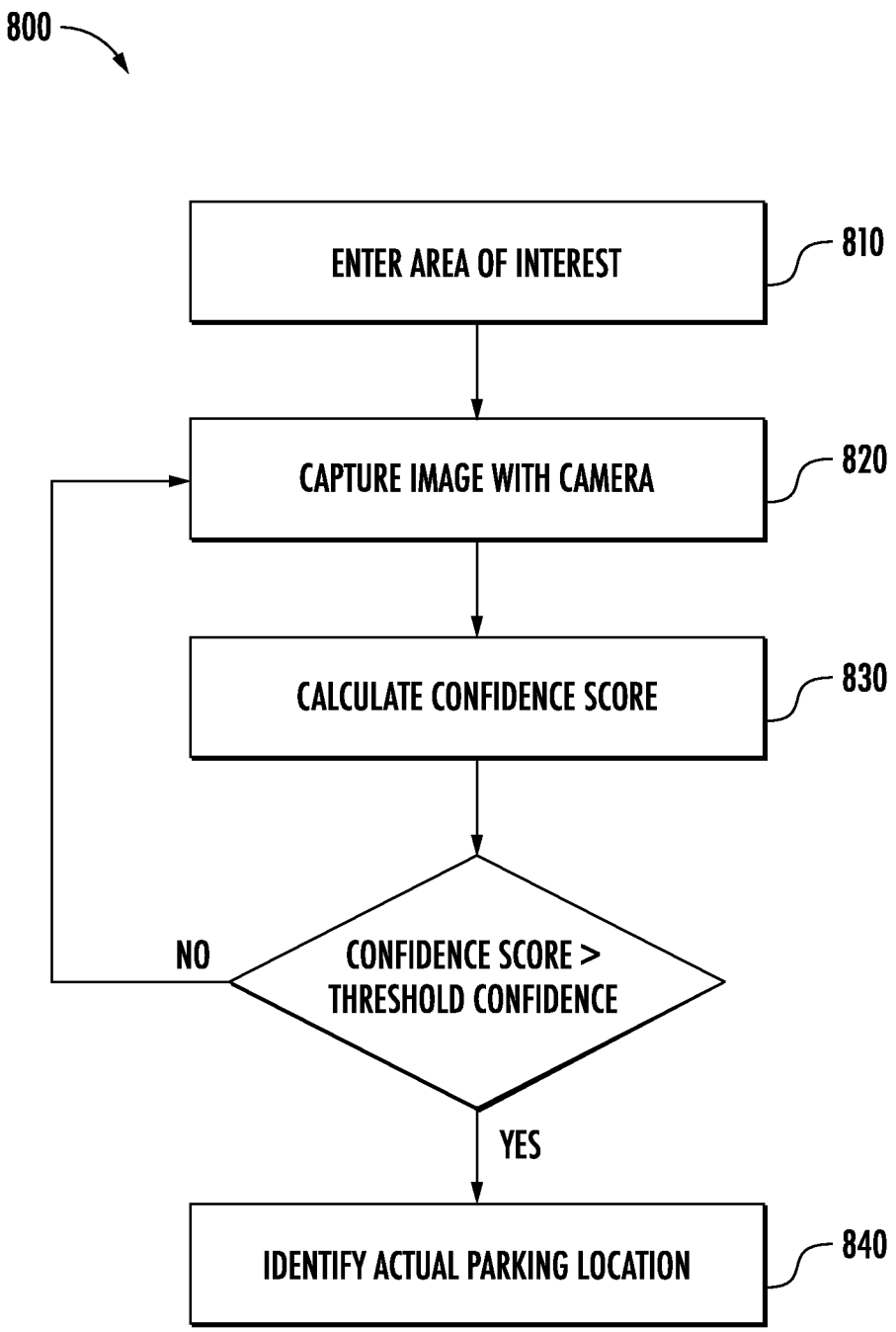
FIG. 8 is a flow diagram of a method for identifying parking according to an example embodiment of the present subject matter.

FIG. 8 is a flow diagram of a method 800 for parking detection according to an example embodiment of the present subject matter. Method 800 will generally be described with reference to passenger vehicle 100 with front camera 158 and rear camera 159. For instance, method 800 may be at least partially executed by the parking identification system, such as by control system 130, and front camera 158 or rear camera 159. However, method 800 may be suitable for use with any other suitable type of vehicle, control system configuration, and/or vehicle system. In addition, although FIG. 8 depict steps performed in a particular order for purposes of illustration and discussion, the methods and algorithms discussed herein are not limited to any particular order or arrangement. One skilled in the art, using the disclosures provided herein, will appreciate that various steps of the methods and algorithms disclosed herein can be omitted, rearranged, combined, and/or adapted in various ways without deviating from the scope of the present disclosure.

At 810, control system 130 may determine whether passenger vehicle 100 is located in an area of interest. For instance, control system 130 may utilize navigation system 154 to access a destination of passenger vehicle 100, and control system 130 may utilize positioning system 156 to access the current location (e.g., GPS coordinates) of passenger vehicle 100. When passenger vehicle 100 is located near the destination of the passenger vehicle 100, control system 130 may implement subsequent steps of method 800 to identify possible parking spaces. The area of interest may correspond to a predetermined radius from the destination of the passenger vehicle 100. As a specific example, the predetermined radius may be no greater than five hundred meters (500 m), which may correspond to a convenient walking distance to the destination of the passenger vehicle 100. It will be understood that other radii and distances from the destination may be used in other example embodiments. As another example, the predetermined radius may be no greater than one kilometer (1 km), which may allow implementation of the subsequent steps of method 800 and thus identification of possible parking location(s) near destinations in order to conserve resources and energy as well as reducing the cost of data transmission.

At 820, a camera, such as front camera 158 or rear camera 159, may capture an image, e.g., of an area around passenger vehicle 100. As an example, when front camera 158 captures the image at 820, front camera 158 may capture an image of an area in front of passenger vehicle 100 along the forward direction of travel F. Conversely, when rear camera 159 captures the image at 820, rear camera 159 may capture an image of an area behind passenger vehicle 100 along the forward direction of travel F. Data corresponding to the image taken by that camera at 820 may be accessed by control system 130. As discussed in greater detail below, the image taken by the camera may include a possible parking space, and a possible parking location may be identified within the image taken by front camera 158 at 820. For example, control system 130 may be configured to identify the possible parking location from the data corresponding to the image taken by the camera.

At 830, a confidence score for the possible parking location may be computed. In example embodiments, at 830, control system 130 may be programmed to utilize process 500 and the four models, namely parking sign recognition model 510, parking lane recognition model 520, road marking recognition model 530, and parked vehicle recognition model 540, to calculate whether the possible parking location is present within the image taken by the camera at 820 with a confidence score, such as high confidence (e.g., greater than seventy-five percent (75%) confidence), low confidence (e.g., greater than fifty percent (50%) confidence and less than seventy-five percent (75%) confidence), or no confidence (e.g., less than fifty percent (50%) confidence).

As a particular example, at 830, when front camera 158 captures the image at 820, the image may include one or more possible parking signs located above or on a roadway that passenger vehicle 100 is travelling along, and control system 130 may utilize the parking sign recognition model 510 to compute a confidence score for whether the possible parking location is present within the image taken by the front camera 158 at 820. As another example, when rear camera 159 captures the image at 820, the image may include one or more possible parking signs located on the roadway that passenger vehicle 100 is travelling along, and control system 130 may utilize the parking sign recognition model 510 to compute a confidence score for whether the possible parking location is present within the image taken by the rear camera 159 at 820. The differing orientation and fields of view between front camera 158 and rear camera 159 may result in different parking signs being captured by the cameras 158, 159.

At 840, method 800 may include identifying the possible parking location from within the image taken by the camera at 820 as an actual parking location when the confidence score is greater than a threshold confidence, e.g., when the calculated confidence is high or low.

Method 800 may also include labeling the confirmed actual parking spot(s) from 840. For example, a location of the actual parking location from 840 may be flagged. Moreover, positioning system 156 may determine the current location (e.g., GPS coordinates) of passenger vehicle 100, and control system 130 may flag the location of the actual parking location as the current location from positioning system 156. The location of the actual parking space may be added to a map overlayed with street parking specific data and/or be used to update with additional parking features. As another example, a time when the actual parking location was identified may be flagged. Thus, e.g., control system 130 may timestamp the actual parking location from 840 in order to assist with identifying when the actual parking location was available. Method 800 may also include determining parameters of the actual parking location, such as an orientation (e.g., parallel, perpendicular, angled, etc.) and/or a size of the actual parking spot. A yaw rate and/or steering wheel angle may also be used to assist with classifying the location, orientation, and/or size of the actual parking spot.

Method 800 may also include transmitting the actual parking location from 840 to another computing device, such as a remote server, that is located offboard passenger vehicle 100. Thus, e.g., control system 130 may transmit the actual parking location from 840 to another computing device, e.g., via wireless communication system 160. As noted above, control system 130 may be located onboard passenger vehicle 100. Thus, method 800, including determining the actual parking location, may be conducted or performed at the edge or onboard passenger vehicle 100, and passenger vehicle 100 can share the actual parking location with other vehicles, map services, etc. The communication may be to a backend via direct short-range communication (DSRC), such as vehicle-to-vehicle communications and/or vehicle-to-infrastructure communications.

The frequency at which the actual parking location is shared or transmitted by be configurable. Thus, e.g., The parking data transmission frequency is configurable. For example, the actual parking location from 840 may be transmitted in real-time, near real-time (e.g., for each street/location/geofence), or as a batch. Such configurable frequency may assist with saving resources, such as time, energy, data costs, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

LIST OF REFERENCE CHARACTERS

100 Passenger vehicle
110 Body
112 Interior cabin
114 Doors
116 Wheels
120 Drivetrain system
122 Motor system
124 Transmission system
126 Electrical accumulator/storage system
128 Torque converter
129 Differential
130 Control system
132 Computing devices
134 Processors
136 Memories
138 Instructions
139 Data
140 Electric machine system
142 Internal combustion engine system
150 Information system
152 Cabin environment system
154 Navigation system
156 Positioning system
158 Front camera
159 Rear camera
160 Wireless communications system
500 Process
510 Model
520 Model
530 Model
540 Model
550 Confidence
600 Method
700 Method
800 Method
F Forward direction
R Reverse direction
α Field of view of front camera
β Field of view of rear camera

What is claimed is:

1. A parking detection method, comprising:

accessing, with a computing device, data corresponding to an image from a front camera on the vehicle;

computing, with the computing device, a confidence score for a possible parking location from the data corresponding to the image from the front camera on the vehicle, wherein computing the confidence score comprises detecting a possible parking sign located on or above a roadway from the data corresponding to the image from the front camera on the vehicle;

when the confidence score is greater than a threshold confidence, identifying, with the computing device, the possible parking location as an actual parking location; and when the confidence score is less than the threshold confidence, confirming, with the computing device, the possible parking location as the actual parking location based at least in part on data corresponding to an image from a rear camera on the vehicle, the rear camera having a wider field of view than the front camera.

2. The parking detection method of claim 1, further comprising accessing, with the computing device, data corresponding to a location of a vehicle, wherein accessing the data corresponding to the image from the front camera comprises accessing the data corresponding to the image from the front camera while the location of the vehicle corresponds to a region of interest.

3. The parking detection method of claim 2, wherein the region of interest comprises an area near a destination of the vehicle.

4. The parking detection method of claim 1, wherein computing the confidence score further comprises one or more of:

detecting a possible parking lane from the data corresponding to the image from the front camera on the vehicle;

detecting a possible road marking from the data corresponding to the image from the front camera on the vehicle; and detecting a possible parked vehicle from the data corresponding to the image from the front camera on the vehicle.

5. The parking detection method of claim 1, further comprising transmitting data corresponding to a location of the actual parking location to a remote computing device located offboard the vehicle.

6. A control unit, programmed to implement the method of claim 1.

7. A parking detection method, comprising:

accessing, with a computing device, data corresponding to an image from a rear camera on the vehicle;

computing, with the computing device, a confidence score for a possible parking location from the data corresponding to the image from the rear camera on the vehicle, wherein computing the confidence score comprises detecting a possible parking sign located on a roadway from the data corresponding to the image from the rear camera on the vehicle;

when the confidence score is greater than a threshold confidence, identifying, with the computing device, the possible parking location as an actual parking location; and when the confidence score is less than the threshold confidence, confirming, with the computing device, the possible parking location as the actual parking location based at least in part on data corresponding to a meshed image formed from the image from the rear camera and a reversed image from a front camera on the vehicle.

8. The parking detection method of claim 7, further comprising accessing, with the computing device, data corresponding to a location of a vehicle, wherein accessing the data corresponding to the image from the rear camera comprises accessing the data corresponding to the image from the rear camera while the location of the vehicle corresponds to a region of interest.

9. The parking detection method of claim 8, wherein the region of interest comprises an area near a destination of the vehicle.

10. The parking detection method of claim 7, wherein computing the confidence score further comprises one or more of:

detecting a possible parking lane from the data corresponding to the image from the rear camera on the vehicle;

detecting a possible road marking from the data corresponding to the image from the rear camera on the vehicle; and detecting a possible parked vehicle from the data corresponding to the image from the rear camera on the vehicle.

11. The parking detection method of claim 7, further comprising transmitting data corresponding to a location of the actual parking location to a remote computing device located offboard the vehicle.

12. A control unit, programmed to implement the method of claim 7.

13. A parking detection method, comprising:

accessing, with a computing device, data corresponding to an image from a front camera on a vehicle;

accessing, with the computing device, data corresponding to an image from a rear camera on the vehicle;

identifying, with the computing device, a possible vacant parking location from one of both of the data corresponding to the image from the front camera on the vehicle and the data corresponding to the image from the rear camera on the vehicle;

computing, with the computing device, a confidence score for the possible vacant parking location from one or both of the data corresponding to the image from the front camera on the vehicle and the data corresponding to the image from the rear camera on the vehicle;

when the confidence score is greater than a threshold confidence, identifying, with the computing device, the possible vacant parking location as an actual vacant parking location; and when the confidence score is less than the threshold confidence, confirming, with the computing device, the possible vacant parking location as the actual vacant parking location based at least in part the other or both of the data corresponding to the image from the front camera on the vehicle and the data corresponding to the image from the rear camera on the vehicle, wherein the front camera is a monochrome camera, the rear camera is a color camera, and the rear camera has a wider field of view than the front camera.

14. The parking detection method of claim 13, wherein the front camera comprises a camera configured as a component of an advanced driver assistance system of the vehicle.

15. The parking detection method of claim 13, wherein the rear camera comprises a camera configured as a backup camera of the vehicle.

16. The parking detection method of claim 13, wherein computing the confidence score comprises one or more of:

detecting a possible parking sign from one or both of the data corresponding to the image from the front camera on the vehicle and the data corresponding to the image from the rear camera on the vehicle;

detecting a possible parking lane from one or both of the data corresponding to the image from the front camera on the vehicle and the data corresponding to the image from the rear camera on the vehicle;

detecting a possible road marking from one or both of the data corresponding to the image from the front camera on the vehicle and the data corresponding to the image from the rear camera on the vehicle; and detecting a possible parked vehicle from one or both of the data corresponding to the image from the front camera on the vehicle and the data corresponding to the image from the rear camera on the vehicle.

17. The parking detection method of claim 13, further comprising:

determining, with the computing device, one or more parameters of the actual vacant parking location, wherein the one or more parameters comprise an orientation of the actual parking spot and a size of the parking spot; and transmitting data corresponding to a location of the actual vacant parking location and the one or more parameters of the actual vacant parking location to another computing device located offboard the vehicle.

18. The parking detection method of claim 13, wherein the computing device is located onboard the vehicle, and the method further comprises transmitting, with the computing device, data corresponding to the actual parking location to another computing device located offboard the vehicle.

19. The parking detection method of claim 18, wherein transmitting the data corresponding to actual parking location comprises transmitting the data corresponding to actual parking location at a configurable frequency.

20. A control unit, programmed to implement the method of claim 13.

\* \* \* \* \*